(12) United States Patent
Almalki

(10) Patent No.: US 7,116,658 B1
(45) Date of Patent: Oct. 3, 2006

(54) APPARATUS AND METHOD FOR AAL2 PACKET SWITCHING ON AN ATM SWITCH CORE

(75) Inventor: Safa Almalki, Nepean (CA)

(73) Assignee: Cisco Technology, Inc., San Jose, CA (US)

( * ) Notice: Subject to any disclaimer, the term of this patent is extended or adjusted under 35 U.S.C. 154(b) by 674 days.

(21) Appl. No.: 09/886,529

(22) Filed: Jun. 20, 2001

(51) Int. Cl.
H04L 12/66 (2006.01)
H04L 12/56 (2006.01)

(52) U.S. Cl. .................... 370/356; 370/392; 370/395.6

(58) Field of Classification Search ........ 370/352–356, 370/389, 392, 395.6–395.66
See application file for complete search history.

(56) References Cited

U.S. PATENT DOCUMENTS 5,953,339 A * 9/1999 Baldwin et al. ............ 370/397
6,393,025 B1 * 5/2002 Merritt ..................... 370/395.6
6,594,267 B1 * 7/2003 Dempo ................... 370/395.64
6,639,916 B1 * 10/2003 Wakizaka .................... 370/397

OTHER PUBLICATIONS

"Protocol Directory—ATM Cell, " http://www/protocols.com/pbook/atmcell.htm (Jan. 26, 2001).

* cited by examiner

Primary Examiner—Chi Pham
Assistant Examiner—Melanie Jagannathan
(74) Attorney, Agent, or Firm—Blakely, Sokoloff, Taylor & Zafman LLP

(57) ABSTRACT

An apparatus is described having an ATM switch core, wherein the ATM switch core has an input coupled to an ingress AAL2 switch engine and an output coupled to an egress AAL2 switch engine. The ingress AAL2 switch engine has a first look-up table that can store: 1) an identification label for an AAL2 virtual channel through said ATM switch core; and, 2) an AAL2 egress connection identification label for an ingress AAL2 packet to be carried by the AAL2 virtual channel. The egress AAL2 switch engine has a second look-up table that can store an egress CID and egress VPI/VCI for the AAL2 egress connection identification label.

32 Claims, 5 Drawing Sheets

| IN | | | OUT | |
|---|---|---|---|---|
| PORT# | VPI/VCI | CID | EID | P# |
| $A_1$ | $A_2$ | $A_3$ | $A_4$ | $A_5$ |
| $B_1$ | $B_2$ | $B_3$ | $B_4$ | $B_5$ |
| $C_1$ | $C_2$ | $C_3$ | $C_4$ | $C_5$ |
| ⋮ | ⋮ | ⋮ | ⋮ | ⋮ |
| $q_1$ | $q_2$ | $q_3$ | $q_4$ | $q_5$ |

| IN | OUT | | |
|---|---|---|---|
| EID | CID | VPI/VCI | PORT# |
| $X_4$ | $X_6$ | $X_7$ | $X_8$ |
| $Y_4$ | $Y_6$ | $Y_7$ | $Y_8$ |
| $Z_4$ | $Z_6$ | $Z_7$ | $Z_8$ |
| ⋮ | ⋮ | ⋮ | ⋮ |
| $m_4$ | $m_6$ | $m_7$ | $m_8$ |

APPARATUS AND METHOD FOR AAL2 PACKET SWITCHING ON AN ATM SWITCH CORE

FIELD OF THE INVENTION

The field of invention relates generally to networking; and, more specifically, to an apparatus and method for AAL2 packet switching on an ATM switch core.

BACKGROUND

AAL2 is a packet based ATM standard (ITU-T I.366) that allows multiple users to share the same Virtual Path Identification/Virtual Channel Information (VPI/VCI). FIG. 1a elaborates on the AAL2 approach in more detail. Within an AAL2 framework, AAL2 packets (such as the packet formed by header 101a and payload 102a and the packet formed by header 101b and payload 102b) are transported over an ATM network.

As ATM cells are used to transport information over an ATM network, the AAL2 packets observed in FIG. 1a are "broken down" into separate pieces of information that are each carried by individual ATM cells (which are not shown in FIG. 1a for simplicity). Upon their reception, the payload of the ATM cells are pieced back together to form the flow of packets.

Frequently, neighboring packets are associated with different connections. For example, the packet formed by header 101a and payload 102a may be destined for a first user while the packet formed by header 101b and payload 102b may be destined for a second user. Thus, within each header 101a, 101b, is a Connection Identification (CID) label that informs a receiving node as to which connection the corresponding payload 102a, 102b belongs.

Under the current ITU-T I.366 specification, 6 bits are reserved within the CID which allows for 248 different connections. As such, up to 248 different AAL2 connections can be carried by a single VPI/VCI ATM connection. Note that information within different AAL2 packets may be carried by the same ATM cell. That is, the payload of a single ATM cell may contain information at (and on either side of) the transition X from the first packet to the second packet seen in FIG. 1a. As such, a pointer may also be included in the packet header to signify where a packet starts and where a packet ends.

FIG. 1b shows a model 103 for an AAL2 switch. Ingress ATM cells are received on a plurality of ingress lines (such as ingress line 108). A line, such as an ingress line, may be any line that carries ATM cells (such as any OC-n line or STS-n line). The ATM cell traffic from the ingress lines are collected on the ingress portion 105a, 106a, 107a of one or more line cards.

The ingress portion 105a, 106a, 107a of each of the line cards reconstructs AAL2 packets from the payloads of the received ATM cells. The AAL2 packets are then forwarded to an AAL2 switch core 104 that switches each ingress AAL2 packet, based upon its respective CID, to the appropriate egress line card portion 105b, 106b, 107b. The AAL2 switch core 104 can change the CID label to an appropriate egress value for transmission from the switch 103. Note that, frequently, a single line card has both an ingress portion and an egress portion.

Thus, for example, ingress portion 105a and egress portion 105b may be viewed as separate portions of a first line card; ingress portion 106a and egress portion 106b may be viewed as separate portions of a second line card; and ingress portion 107a and egress portion 107b may be viewed as separate portions of a third line card. Upon receipt of an AAL2 packet at an egress portion, the AAL2 packet may be broken down into pieces that are carried by different ATM cells which are subsequently transmitted along the appropriate egress line (such as egress line 109).

A problem, however, is the loss of economies of scale when implementing an AAL2 switch with an AAL2 switch core 104. That is, AAL2 is a specific type of networking approach. As other types of networking approaches are in common usage (e.g., pure ATM, AAL3/4, AAL5, Packets Over SONET (PoS), etc.), a switch having an AAL2 switch core 104 can not efficiently switch the traffic associated with these other types of networking approaches.

SUMMARY

An apparatus is described having an ATM switch core, wherein the ATM switch core has an input coupled to an ingress AAL2 switch engine and an output coupled to an egress AAL2 switch engine. The ingress AAL2 switch engine has a first look-up table that can store: 1) an identification label for an AAL2 virtual channel through said ATM switch core; and, 2) an AAL2 egress connection identification label for an ingress AAL2 packet to be carried by the AAL2 virtual channel. The egress AAL2 switch engine has a second look-up table that can store an egress CID and egress VPI/VCI for the AAL2 egress connection identification label.

BRIEF DESCRIPTION OF THE DRAWINGS

The present invention is illustrated by way of example, and not limitation, in the Figures of the accompanying drawings in which:

FIG. 3 shows a look up table that may be used by an ingress AAL2 switch engine of FIG. 2;

FIG. 4 shows a look up table that may be used by an egress AAL2 switch engine of FIG. 2.

DETAILED DESCRIPTION

An apparatus is described having an ATM switch core, wherein the ATM switch core has an input coupled to an ingress AAL2 switch engine and an output coupled to an egress AAL2 switch engine. The ingress AAL2 switch engine has a first look-up table that can store: 1) an identification label for an AAL2 virtual channel through said ATM switch core; and, 2) an AAL2 egress connection identification label for an ingress AAL2 packet to be carried by the AAL2 virtual channel. The egress AAL2 switch engine has a second look-up table that can store an egress CID and egress VPI/VCI for the AAL2 egress connection identification label.

A solution to the economy of scale problem presented in the background is to implement the functionality of an AAL2 switch upon an ATM switch core. An ATM switch core switches ATM cells based upon their VPI/VCI information. Various types of ATM switch core architectures exist, such as crossbar switches and shared output buffered switches (to name just a few). As ATM cells are a fundamental transport unit for various types of networking approaches (e.g., pure ATM, AAL2, AAL3/4, AAL5, PoS, etc.), an ATM switch core is better suited to cost effectively manage the switching function of these various approaches.

Figure 2:
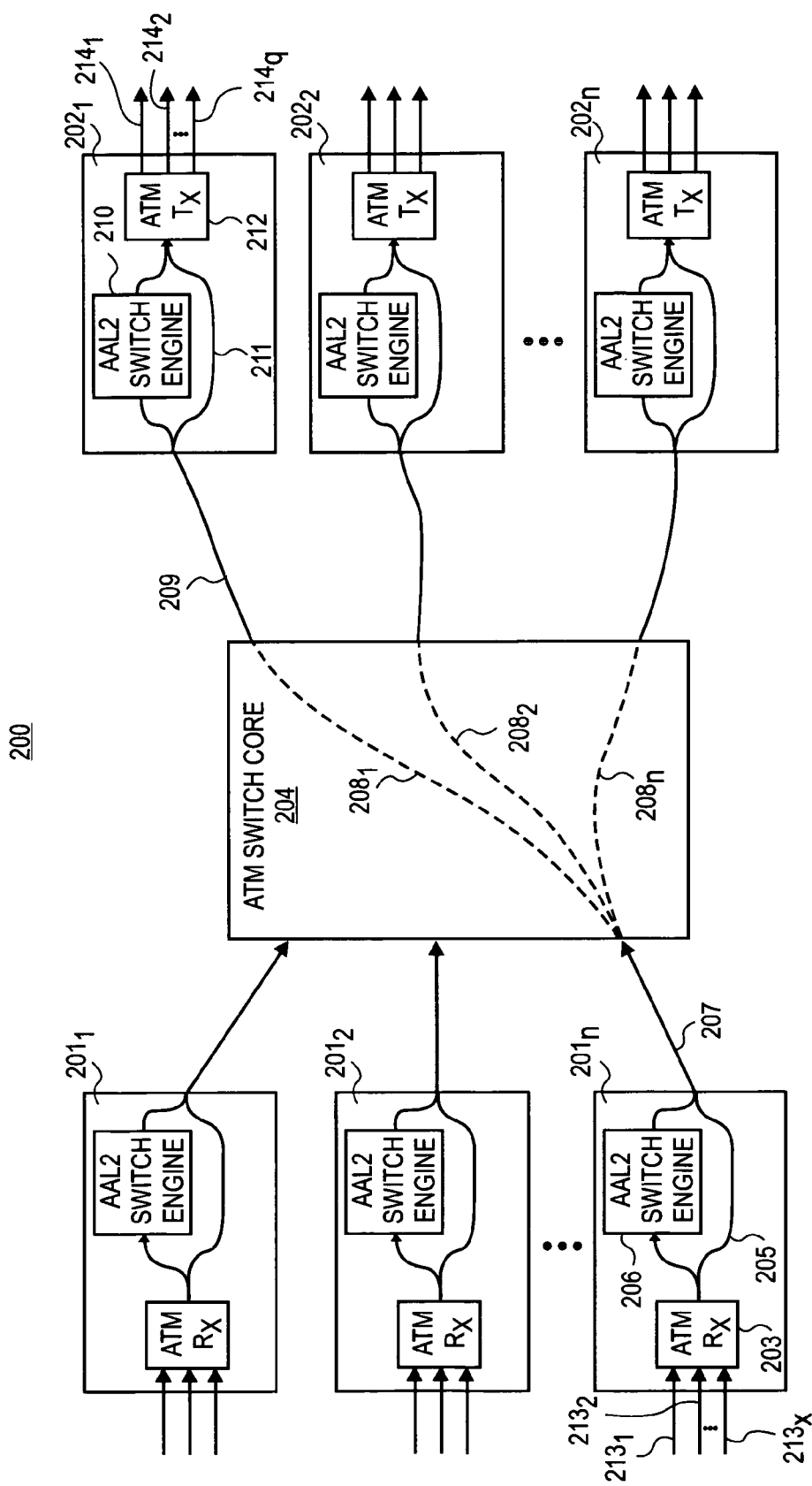
FIG. 2 shows an embodiment of an architecture that implements the functionality of an AAL2 switch with an ATM switch core.

FIG. 2 shows an embodiment of an architecture that implements the functionality of an AAL2 switch with an ATM switch core. Ingress ATM cells are received on a plurality of ingress lines (such as ingress lines $213_1$, $213_2$, through $213_x$). The ATM cell traffic from the ingress lines are collected on the ingress portion $201_1$, $201_2$, ... $201_n$ of one or more line cards.

Each ingress line may be deemed to correspond to an ingress port of the switch architecture 200 of FIG. 2. In the embodiment of FIG. 2, the ATM Rx units (e.g., ATM Rx unit 203) provide ATM cells that are received from a plurality of ingress ports. For example, each ATM Rx unit may correspond to an ATM physical layer (PHY) interface device. Those ATM cells that are not associated with an AAL2 packet flow (as identified by their VPI/VCI address) are forwarded to the ATM switch core 204 (e.g., along logical path 205 for cells provided by ATM Rx unit 203).

Those ATM cells having a VPI/VCI associated with an AAL2 packet flow are forwarded to an ingress AAL2 switch engine 206. An AAL2 ingress switch engine 206, as described in the exemplary details that follow, is a functional unit that effectively converts information that characterizes an ingress AAL2 packet (e.g., its CID value, its VPI/VCI address, its ingress port, etc.) into: 1) information that is used by the ATM switch core 204 to direct the AAL2 packet to its appropriate egress line card portion; and 2) information that is used by the appropriate egress line card portion to understand which egress port, egress CID value and egress VPI/VCI information should be implemented into the outgoing AAL2 packet and the outgoing ATM cells used to transport it.

Figure 1A:
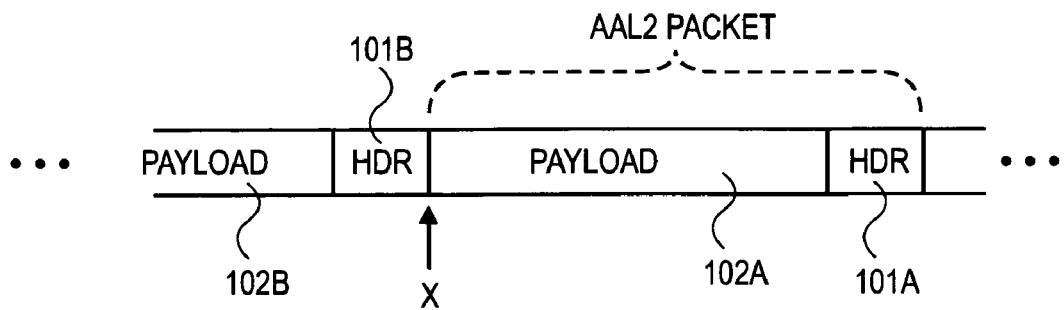
FIG. 1a shows a sequence of AAL2 packets.

In the embodiment of FIG. 2, the AAL2 switch engine 206 reassembles the payloads from the ATM cells it receives. Note that those ATM cells having the same VPI/VCI can correspond to a multi-user stream of AAL2 packets such as the stream of packets shown back in FIG. 1a. As a single ingress port may support multiple VPI/VCI addresses that each support an AAL2 packet stream; and, as multiple ingress ports may be received by the ATM Rx unit 203, a plurality of AAL2 packet streams may be processed by the ingress AAL2 switch engine 206 of FIG. 2.

The switch engine 206 effectively directs each AAL2 packet, regardless as to which AAL2 packet stream it arrived on, to its appropriate egress line card portion (e.g., egress line portion $202_1$, $202_2$, ... or $202_n$ as seen in FIG. 2) through the ATM switch core 204. FIG. 3 shows an exemplary look-up table 300 that may be employed by an ingress AAL2 switch engine 206 to help direct a particular AAL2 packet to its appropriate egress line card portion.

The inputs to the look-up table 300 of FIG. 3 include: 1) the CID of the AAL2 packet to be directed; 2) the VPI/VCI address of the AAL2 packet stream that the AAL2 packet to be directed arrived with; and 3) the port on which the AAL2 packet arrived. The combination of these three items are unique to any AAL2 packet arriving at the ATM Rx unit 203 for a particular user. That is, for example, CID values may be reused for different connections across the various VPI/VCI address values that correspond to an AAL2 packet stream. In the embodiment of FIG. 3, VPI/VCI values may conceivably also be reused for different AAL2 streams across the various input ports that are received by the ATM Rx unit 203.

Thus, in the embodiment of FIG. 3, each input/output entry of the look up table 300 corresponds to a particular AAL2 connection supported by the switch 200 of FIG. 2. As seen in the embodiment of FIG. 3, the output contents of the look up table 300 provide: 1) The pipe number (P#); and 2) the egress identification number (EID). The P# is information that is used by the ATM switch core 204 to direct the AAL2 packet to its appropriate egress line card portion.

The EID information (which is appended to the payload of the AAL2 packet as it traverses the ATM switch core 204) is transported with the payload of a received AAL2 packet as it traverses the ATM switch core 206. The EID information helps the appropriate egress line card portion understand which egress port, egress CID value and egress VPI/VCI information should be implemented into the outgoing AAL2 packet and the outgoing ATM cells used to transport it. In the following, a discussion of the P# will precede a discussion of the EID.

In the embodiment of FIGS. 2 and 3, the P# effectively points to (or otherwise triggers the use of) a local, virtual channel within the ATM switch core 204 used to carry AAL2 packet flows. Exemplary AAL2 virtual channels $208_1$, $208_2$, $208_n$ that respectively couple ingress line card portion $201_n$ to each egress line card portion $202_1$, $202_2$ ... $202_n$ are shown in FIG. 2. The AAL2 virtual channels $208_1$, $208_2$, $208_n$ may be established within the ATM switch core 204 as permanent connections in light of the AAL2 packet flows that the switch 200 is configured to support.

For example in one approach, if an ingress line card portion is configured to actively receive AAL2 packet flows (e.g., by enabling the ingress switch AAL2 engine), an AAL2 virtual channel is established through the ATM switch core 204 from the ingress line card to each egress line card portion $202_1$, $202_2$ through $202_n$. For example, as seen in FIG. 2, once ingress line card portion $201_n$ is configured to actively receive an AAL2 packet flow, AAL2 virtual channels $208_1$, $208_2$, $208_n$ are created within the ATM switch core 204 in response. Note that from the perspective of the ATM switch core 204, each AAL2 virtual channel $208_1$, $208_2$, $208_n$ may be viewed as an ATM virtual channel.

This provides the newly configured AAL2 service with the versatility to switch AAL2 packets to any egress destination. In an alternate embodiment, the egress line of a particular AAL2 packet connection is fixed. As such, only one virtual channel that connects the ingress line card portion to the appropriate egress line card portion is needed.

In a further embodiment of either of these approaches, the capacity of the virtual channel through the ATM switch core 204 is extended to support more than one AAL2 packet flow (e.g., up to 248 different AAL2 connections). This allows an ingress line card portion that manages the reception of different AAL2 packet connections (e.g., if ingress line card portion $201_n$ is configured to manage different AAL2 connections received across ingress lines $213_1$ through $213_n$) to "pipe" AAL2 packets having the same egress line card portion destination (e.g., egress line card portion $202_1$) over a common virtual channel through the ATM switch core (e.g., virtual channel $208_1$). For example, under current implementations, each VPI/VCI recognized by the ATM switch core 204 can have as many as 248 connections via the CID header parameter.

As discussed, non AAL2 packet flows (such as pure ATM cell switching flows) avoid the ingress AAL2 switch engine 206 and are presented to the ATM switch core 204 and switched by normal means. For example, for pure ATM flows on ingress line card portion $201_n$, ATM cells traverse logical path 205 and are presented to the ATM switch core

204. The ATM switch core 204 may switch these cells based upon their VPI/VCI information.

AAL2 packets are also effectively presented to the ATM switch core 204 after processing by the ingress AAL2 switch engine 206. In an embodiment, AAL2 packet payloads destined for the same egress line card portion are inserted into one or more ATM cells having a VPI/VCI address that corresponds to the appropriate virtual channel (e.g., AAL2 virtual channel $208_1$ for egress line card portion $202_1$, AAL2 virtual channel $208_2$ for egress line card portion $202_2$, and AAL2 virtual channel $208_n$ for egress line card portion $202_n$). In this approach, this VPI/VCI address corresponds to the P# that is listed in the ingress AAL2 switching engine look up table 300 shown in FIG. 3.

As such, the P# effectively points to the appropriate AAL2 virtual channel and also provides a means (e.g., a VPI/VCI address) that is recognized by an ATM switch core 204 to appropriately direct traffic through the switch core 204. Note that the stream of ATM cells carrying AAL2 packet payload information across the same virtual channel (through the ATM switch core 204) may be formatted with appropriate AAL2 overhead. As such, a stream of AAL2 packets (similar to that shown in FIG. 1a) are reassembled from the cell payloads upon their reception at the destination egress line card portion.

In this approach, the cells used to carry the AAL2 packet stream are formatted with the VPI/VCI found as the P# within look up table 300 of FIG. 3. In this case, the egress AAL2 switch engine (e.g., egress AAL2 switch engine 210 for destination line card portion $202_1$) performs the appropriate AAL2 packet reassembly. Note that, upon the reception of ATM cells from the ATM switch core 204 at an egress line card portion, those ATM cells having a VPI/VCI address that corresponds to an AAL2 virtual channel through the ATM switch core 204 are diverted for processing by the egress AAL2 switching engine 210. That is, as virtual channels carry AAL2 information, the egress AAL2 switching engine 210 is invoked for cells carried along these channels.

Those ATM cells not having a VPI/VCI address that corresponds to an AAL2 virtual channel through the ATM switch core 204 follow logical path 211 to the ATM Tx unit 212. Note that, these "non AAL2" cells may have their VPI/VCI address changed by the ATM switch core 204 consistent with ATM cell switching technology. For those cells having a VPI/VCI address that corresponds to an AAL2 virtual channel through the ATM switch core 204, however, no such change is necessary as the virtual channel may be viewed as local to the ATM switch core 204.

Recall that the EID information found in the look-up table 300 of Figure is effectively appended to the payload of an AAL2 packet as it traverses the ATM switch core 204. The EID, as described in more detail immediately below, helps the appropriate egress AAL2 switch engine 210 understand which egress port, egress CID value and egress VPI/VCI information should be implemented into the outgoing AAL2 packets and the outgoing ATM cells used to transport them.

The EID may be viewed as a local extension to the CID. That is, recall that the CID identifies AAL2 connections that are particular to a VPI/VCI. In the embodiment of FIG. 2, the EID identifies AAL2 connections that are particular to an egress line card portion. That is, each egress line card portion $202_1$, $202_2$, ... $202_n$ "keeps track of" separate EID numbers that are used to identify each AAL2 connection that it controls the transmission of.

Thus, for example, when updating the look up table 300 for an ingress switch engine (e.g., ingress switch engine 206) with information for a new connection, the particular EID number given to the connection is determined in light of the available EID numbers that may be used by the particular egress switch engine (e.g., egress switch engine 210) that will handle the traffic for the connection. In order for the switch to handle more than one VPI/VCI address worth of AAL2 traffic per egress line card portion (i.e., in order for the switch to handle more than 248 outgoing AAL2 connections per egress line card portion), the size of the EID field should be larger than the size of the CID field.

In an embodiment, the EID field size is 16 bits which allows for over 64,000 AAL2 connections per egress line card portion. Alternate embodiments may reduce the EID field size to less than 16 bits (if less than 64,000 AAL2 connections per egress line card portion is desired) or may expand the EID field size to more than 16 bits (if more than 64,000 AAL2 connections per egress line card portion is desired). Various techniques may be used to append the EID number to an AAL2 packet prior to processing by the ATM switch core. For example, in an embodiment where a stream of AAL2 packets (similar to FIG. 1a) are segmented and carried by ATM cells 204 over the ATM switch core, the EID may be comprised of the CID field plus additional header space within the AAL2 packet (e.g., reserved bit locations).

Alternatively or in combination, the ATM switch core interface 207 may allow for a control header that is presented along with each cell offered to the ATM switch core 204 for service. Such a control header may be formatted to include the EID number particular to the AAL2 packet(s) being carried by the ATM cell. Such a control header may also be used to identify an AAL2 virtual channel number (i.e., a P# other than a VPI/VCI address) that is recognized by the ATM switch core 204.

After the payload for an AAL2 packet and its corresponding EID number is recognized by an egress AAL2 switch engine 210, the egress AAL2 switch engine 210 looks up appropriate information for the outgoing connection based upon the EID number. FIG. 4 shows an embodiment of such a look up table 400. As mentioned just above, the look up is based upon the EID number. As such, the EID number is the look up table 400 input parameter.

Figure 1B:
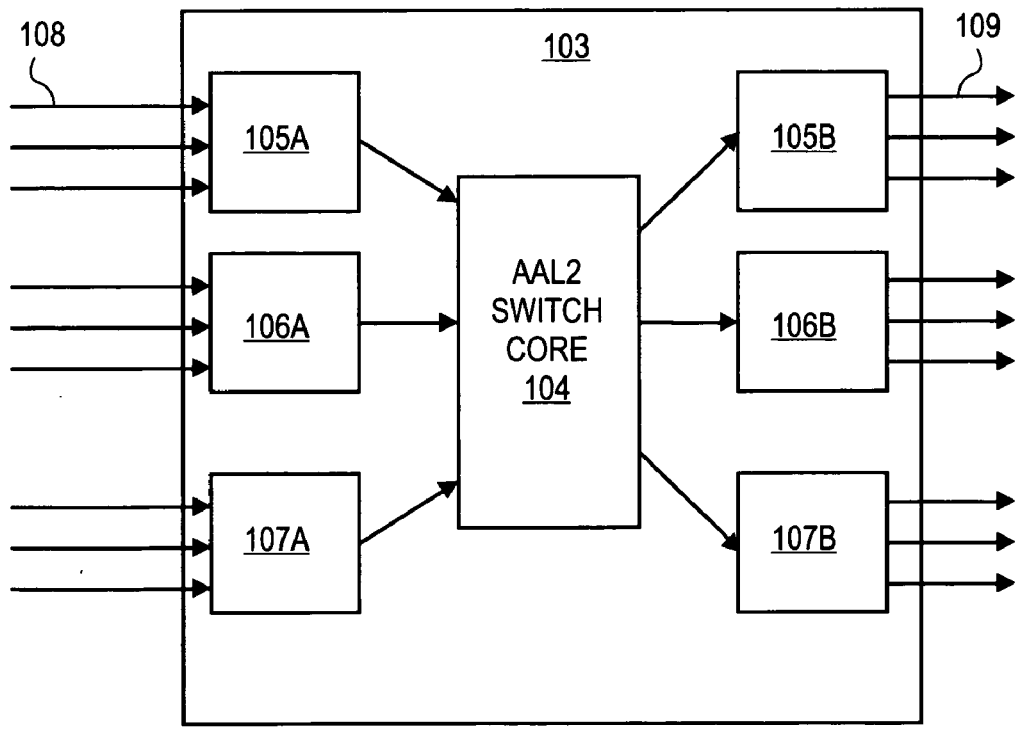
FIG. 1b shows a model for an AAL2 switch.

The output parameters in the look up table embodiment 400 of FIG. 4 include: 1) the CID number for the outgoing connection; 2) the VPI/VCI address to be used by the ATM cells that will be used to transport the outgoing AAL2 packet; and 3) the outgoing port (e.g., outgoing network line such as any of lines $214_1$, $214_2$, through $214_y$). Note that, consistent with the operation of an AAL2 switch, CID numbers are switched from ingress to egress as discussed with respect to FIG. 1b. Furthermore, as is clear from above, an egress AAL2 switch engine effectively converts the EID into information that is used to properly transmit the AAL2 packet (e.g., its CID, its corresponding VPI/VCI and its corresponding output port).

Once the information is gathered for the outgoing connection from the look-up table, the proper AAL2 header structure is formed (including the CID found in the table 400) and appended to the payload. The AAL2 header and payload is then segmented as necessary into ATM cells having the VPI/VCI found in the table. These cells are then forwarded to the ATM Tx unit (such as ATM Tx unit 212) with the outgoing port information found in the look up table so that the cells are transported over the correct outgoing line. The ATM Tx unit 212 may correspond to an ATM transmission PHY device.

Figure 5:
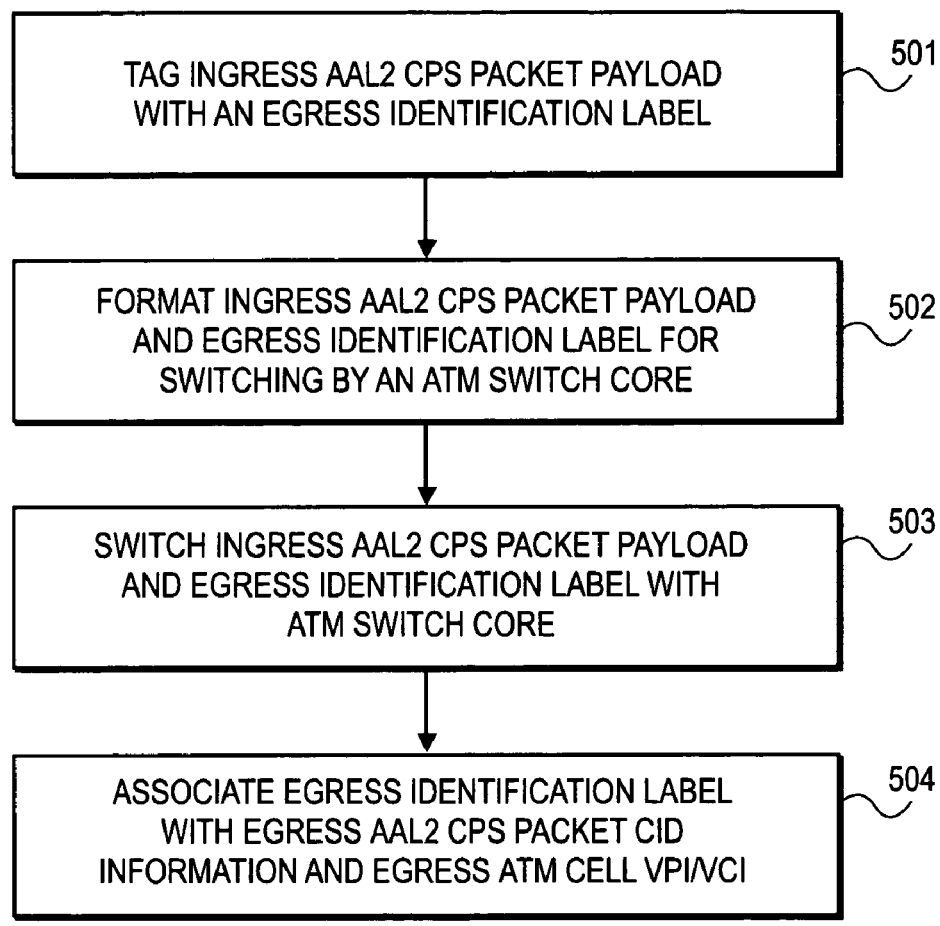
FIG. 5 shows a method for implementing AAL2 switching on an ATM switch core.

FIG. 5 shows a methodology that reviews the AAL2 switching sequence approach discussed above. Note that, although the methodology of FIG. 5 is written to correspond to Common Part Sublayer (CPS) AAL2 packets, other types of AAL2 packet characterizations (such as Service Specific Convergence Sublayer (SSCS)) also apply to the methodology of FIG. 5.

Upon the reception of ATM cells that carry AAL2 packet information, the ingress AAL2 packet payload is tagged 501 with an egress identification label (e.g., the EID discussed above). The ingress AAL2 packet payload and egress identification label are then formatted 502 for switching by an ATM switch core (e.g., by incorporating the payload as part of an AAL2 packet stream (that includes the EID in its header space) which is further segmented or otherwise incorporated into a series of ATM cells).

The ingress AAL2 packet payload and its corresponding EID are then switched 503 by the ATM core to the appropriate egress line card portion. The EID is then used at the egress line card to identify 504 the CID and VPI/VCI information for the outgoing connection the AAL2 payload is to be delivered over. Note that the ingress or egress AAL2 switch engines may be implemented as a processor that performs the methodologies described above in software, as dedicated logic that performs the methodologies described above, or as some combination of both.

Thus, embodiments of the present description may be implemented not only within a semiconductor chip but also within machine readable media. For example, the designs discussed above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behaviorial level netlist, a register transfer level (RTL) netlist, a gate level netlist and a transistor level netlist. Machine readable media also include media having layout information such as a GDS-II file. Furthermore, netlist files or other machine readable media for semiconductor chip design may be used in a simulation environment to perform the methods of the teachings described above.

Thus, it is also to be understood that embodiments of this invention may be used as or to support a software program executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus, comprising:
  an ATM switch core having an input coupled to an ingress AAL2 switch engine and an output coupled to an egress AAL2 switch engine,
  said ingress AAL2 switch engine having a first look-up table that can store:
   1) an identification label for establishing a local AAL2 virtual channel through said ATM switch core, and
   2) an AAL2 egress connection identification label (EID) for an ingress AAL2 packet to be carried by said AAL2 virtual channel,
  said egress AAL2 switch engine having a second look-up table that can store the EID, and an egress port number, an egress CID, and an egress VPI/VCI associated with the EID, said egress AAL2 switch engine replaces parts of the ingress AAL2 packet with the egress CID and the egress VPI/VCI, producing an outgoing AAL2 packet.

2. The apparatus of claim 1 wherein said first look-up table can store input look-up information that comprises an ingress CID of said ingress AAL2 packet.

3. The apparatus of claim 2 wherein said input look-up information further comprises a VPI/VCI of an ATM cell that carries said ingress AAL2 packet.

4. The apparatus of claim 2 wherein said input look-up information further comprises an ingress port number of an ATM cell that carries said AAL2 packet.

5. The apparatus of claim 1 further comprising an ATM physical layer device coupled to an input of said ingress AAL2 switch engine, said ATM physical layer device for providing ATM cells received from one or more ingress network lines.

6. The apparatus of claim 5 wherein at least one of said one or more ingress network lines is an OC-n based network line.

7. The apparatus of claim 1 further comprising an ATM physical layer device coupled to an output of said egress AAL2 switch engine, said ATM physical layer device for transmitting ATM cells over one or more egress network lines.

8. The apparatus of claim 7 wherein at least one of said one or more egress network lines is an OC-n based network line.

9. The apparatus of claim 1 wherein at least one of said switch engines at least partially comprises a processor that runs software.

10. The apparatus of claim 1 wherein said AAL2 packet further comprises a CPS AAL2 packet.

11. The apparatus of claim 1 wherein said AAL2 packet further comprises a SSCS AAL2 packet.

12. A method, comprising:
  a) producing an AAL2 virtual channel pipe number and an AAL2 egress connection identification label EID) in response to an ingress AAL2 packet CID and VPI/VCI;
  b) forwarding at least said ingress AAL2 packet payload and said AAL2 egress connection identification label (EID) over a local AAL2 virtual channel established within an ATM switch core, said AAL2 virtual channel identified by said AAL2 virtual channel pipe number;
  c) replacing the ingress AAL2 packet CID and VPI/VCI by an egress AAL2 switch engine; and
  d) producing an egress AAL2 packet including an egress CID and an egress VPI/VCI based on said AAL2 egress connection identification label, said egress AAL2 packet carrying said ingress AAL2 packet payload.

13. The method of claim 12 further comprising reassembling ingress ATM cells into said ingress AAL2 packet.

14. The method of claim 13 further comprising receiving said ingress ATM cells from a network line.

15. The method of claim 14 wherein said network line is an OC-n based network line.

16. The method of claim 12 wherein said producing an AAL2 virtual channel pipe number and an AAL2 egress connection label further comprises performing a lookup based upon said ingress packet CID and VPI/VCI.

17. The method of claim 12 wherein said producing an egress AAL2 packet CID and VPI/VCI further comprises performing a lookup based upon said AAL2 egress connection identification label.

18. The method of claim 12 further comprising segmenting said egress AAL2 packet into egress ATM cells, said egress ATM cells having said egress packet VPI/VCI.

19. The method of claim 18 further comprising transmitting said egress ATM cells over an egress network line.

20. The method of claim 19 wherein said network line is an OC-n based network line.

21. The method of claim 12 wherein either said ingress AAL2 packet or said egress AAL2 packet is a CPS AAL2 packet.

22. The method of claim 12 wherein either said ingress AAL2 packet or said egress AAL2 packet is a SSCS AAL2 packet.

23. An apparatus, comprising:
  a) means for producing an AAL2 virtual channel identification label and an AAL2 egress connection identification label in response to an ingress AAL2 packet CID and VPI/VCI;
  b) means for forwarding at least said ingress AAL2 packet payload and said AAL2 egress connection identification label over a local AAL2 virtual channel established within an ATM switch core, said AAL2 virtual channel identified by said AAL2 virtual channel identification label;
  c) means for replacing the ingress AAL2 packet CID and VPI/VCI by an egress AAL2 switch engine; and
  d) mean producing an egress AAL2 packet including an egress CID and an egress VPI/VCI based on said AAL2 egress connection identification label, said egress AAL2 packet carrying said ingress AAL2 packet payload.

24. The apparatus of claim 23 further comprising means for reassembling ingress ATM cells into said ingress AAL2 packet.

25. The apparatus of claim 24 further comprising means for receiving said ingress ATM cells from a network line.

26. The apparatus of claim 25 wherein said network line is an OC-n based network line.

27. The apparatus of claim 23 further comprising means for segmenting said egress AAL2 packet into egress ATM cells, said egress ATM cells having said egress packet VPI/VCI.

28. The apparatus of claim 27 further comprising means for transmitting said egress ATM cells over an egress network line.

29. The apparatus of claim 28 wherein said network line is an OC-n based network line.

30. The apparatus of claim 23 wherein either said ingress AAL2 packet or said egress AAL2 packet is a CPS AAL2 packet.

31. The apparatus of claim 23 wherein either said ingress AAL2 packet or said egress AAL2 packet is a SSCS AAL2 packet.

32. A machine readable medium having stored thereon sequences of instructions, which, when executed by a digital processing system cause said digital processing system to perform a method, said method comprising:
  producing an AAL2 virtual channel identification label and an AAL2 egress connection identification label in response to an ingress AAL2 packet CID and VCI/VPI so that at least said ingress AAL2 packet payload and said ML2 egress connection identification label can be forwarded over a local ML2 virtual channel established within an ATM switch core, said AAL2 virtual channel identified by said AAL2 virtual channel identification label;
  replacing an ingress AAL2 packet with an egress CID and an egress VPI/VCI;
  producing an egress AAL2 packet based on the replacement in response to an AAL2 egress connection identification label, at an egress switch engine, said AAL2 egress connection identification label associated forwarded over an ATM switch core with at least a portion of an AAL2 packet payload, said egress AAL2 packet carrying said ingress AAL2 packet payload.

* * * * *